United States Patent [19]

Skogward

[11] 4,011,432
[45] Mar. 8, 1977

[54] CONVERTER

[75] Inventor: Kenneth Oscar Emanuel Skogward, Huskvarna, Sweden

[73] Assignee: Husqvarna AB, Husqvarna, Sweden

[22] Filed: June 10, 1975

[21] Appl. No.: 585,563

[30] Foreign Application Priority Data

June 13, 1974 Sweden .............................. 7407801

[52] U.S. Cl. ................................ 235/61 PE; 74/56
[51] Int. Cl.² .......................................... G06K 1/00
[58] Field of Search ....... 340/347 M, 376, 347 DA; 74/68, 128, 10 R, 56; 235/61 R, 61 PK, 61 PL, 61 PA, 61 PE; 197/16

[56] References Cited

UNITED STATES PATENTS

| | | | |
|---|---|---|---|
| 2,987,716 | 6/1961 | Beguin | 340/347 M |
| 3,200,927 | 8/1965 | Ryan | 340/347 M |

FOREIGN PATENTS OR APPLICATIONS

| | | | |
|---|---|---|---|
| 328,005 | 9/1970 | Sweden | 235/61 R |

*Primary Examiner*—Ulysses Weldon
*Attorney, Agent, or Firm*—Holman & Stern

[57] ABSTRACT

A converter for converting binary codes into mechanically controlled movements which contains adjustment means which by means of an outside signal source is given a special adjustment for each code, a plurality of sets of cam discs, mounted and axially displaceable on a common shaft and adjustable individually with respect to a zero position of the adjustment means, each set of cam discs is disposed with axial cams facing one another, and stopping means and entrainers cooperating with the adjustment means, and that a converter drive system comprises an axial arrangement of the cam disc sets arranged on the common shaft which passes through the converter and on which a cam disc forming part of a pair of cam discs of each set is journalled and driven in an oscillating movement by an indexing mechanism which is driven by rotating means to produce limited relative movements between the discs in the respective cam sets, transformed into axial displacements of the discs relative to the zero position.

6 Claims, 5 Drawing Figures

C-C

CONVERTER

BACKGROUND OF THE INVENTION

The present invention relates to devices for converting binary codes into quantities in the form of mechanically controlled movements. Such devices are utilized in machines controlled by data circuits, e.g., machine tools, transfer machines, automatic handling apparatus, etc., as are well known in the art. The converter can also be substituted for servo motors which have been well known in the prior art. In this, a summation process is used, in which different elements, corresponding to bits in binary code, are added into a quantity corresponding to a decimal number. The device therefore comprises means for mechanically indicating decimal numbers, and adjustment means which, through an outside source, are given a special adjustment for each code.

A binary code, as we know, is composed of a number of terms, consisting of different powers of the number 2. The appearance of a term with a certain exponent is designated by the factor 1 in front of the power expression. Decimal numbers are expressed as the sum of different powers of the number 2, and, vice-versa, the sum of a series of powers of 2 represents, specifically, a certain decimal number. In a concrete embodiment of this principle, a binary code is converted into a decimal dimension by the assembly, in line of, for example, axially placed screw surfaces or cams, whose axial heights represent different powers of the number 2, so that a line composed of selected cams will represent the decimal number which the binary code represents.

Code converters with measuring bodies which are selectively introduced into a measuring device for interpreting a binary code, are known in various forms. Mechanical devices of this kind are saddled with an inertia which up to now has made them unsuitable for recording fast operations. In fast-changing binary codes, the reaction time of the device should not be too long, because there is the risk that the bits of the code will not be reproduced correctly by the device. One way of eliminating this risk is to reduce the inertia of the moving parts and equip the device with adjustment means which, with high precision, arrange the moving parts according to the incoming binary codes.

In mechanical code converters of this type, there is the possibility of substantially amplifying the code-carrying signal simultaneously with the code conversion. In a working machine, it is of great importance to be able to use the output quantity of the converter to produce movements and work operations in the machine. It must therefore be considered desireable that the converter, aside from the said precision in cases of fast-changing binary codes, also have the property of providing a strong amplification of the signals received by the adjustment means.

SUMMARY OF THE INVENTION

The object of the present invention is to solve a problem, which consists in the production of a fast, correct code conversion of binary signals and the emission of the coded quantities in the form of a mechanically controlled movement. A device which, according to the invention is designed to solve the problem, will be equipped with sets of cams disposed on a common shaft for action on one another in an axial direction. The device has control means for releasing the same which, according to the actual binary code, contribute to the output quantity. The invention is characterized by a plurality of measuring bodies, mounted and axially displaceable on a common shaft and adjustable individually with respect to a starting position depending on the drive of the shaft and the position of the adjusting means. The measuring bodies are constituted by sets of cam discs in which the discs are disposed with axial cams facing one another, and stopping means and entrainers cooperating with the adjustment means and shaft to produce limited relative movement between the discs in the respective cam sets, transformed into axial displacement of the discs relative to the starter position.

BRIEF DESCRIPTION OF THE DRAWINGS

An example of execution of the converter according to the invention is described below with reference to the attached drawing in which.

DETAILED DESCRIPTION OF A PREFERRED EMBODIMENT

Figure 3:
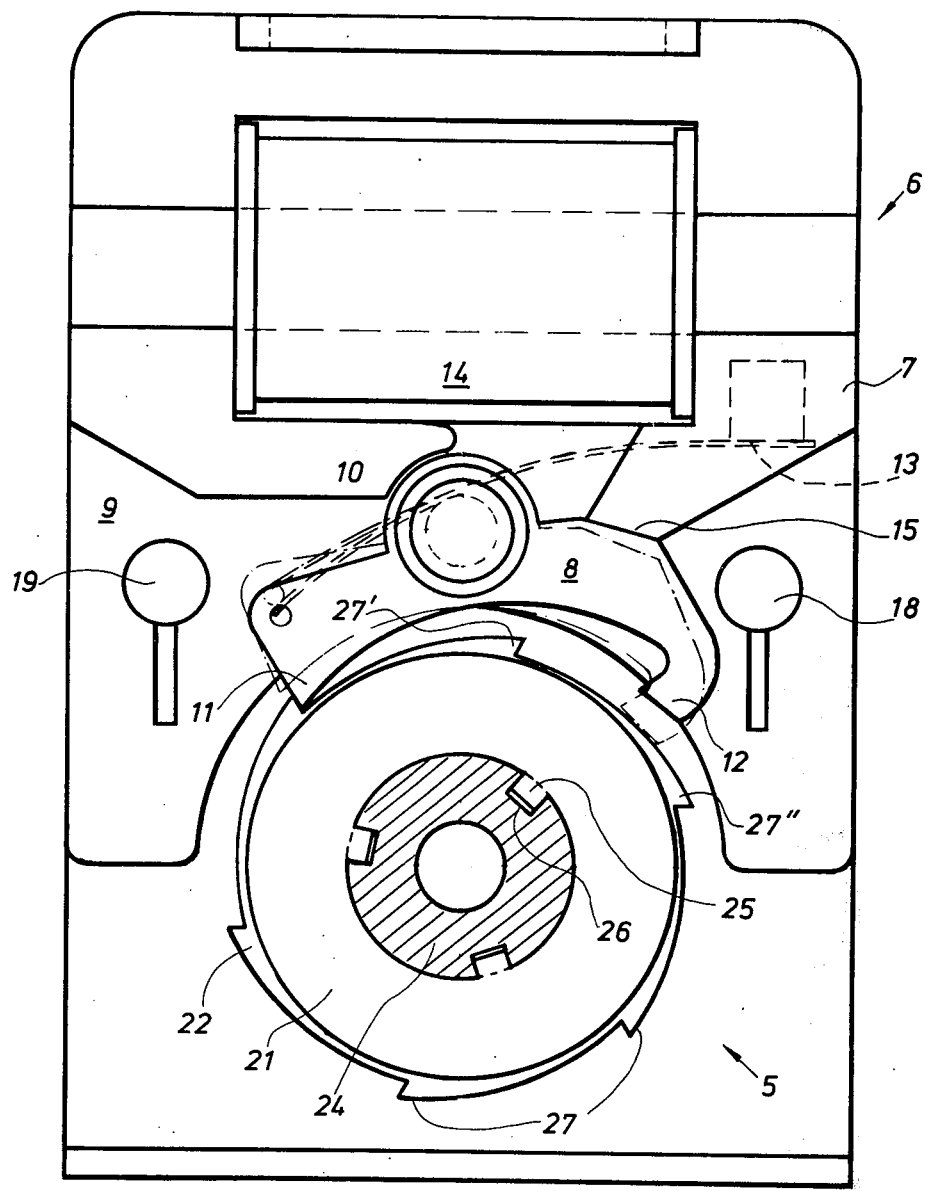
FIG. 3 shows a combination of cam set and control means.

The converter in the form illustrated, is built in two sections, 1, 2 one equipped for production of one output quantity; the second for another; for example, the output quantities can be combined so that the resulting output quantities form a forth and back movement which, on the outside, appears on a pivot, 3, 4, projecting from each section. Each section contains four sets of cam discs 5, placed next to one another, each with its control element 6. Such a unit is shown in FIG. 3. Control element 6 is shown to be an electromagnet 7 with armature 8. In position of rest, the armature is shown by the broken-line profile, in "drawn" position, by the continuous profile. The electromagnet is set in a frame 9, in which a pin 10 is fastened, on which the armature, equipped with a pair of pawls 11, 12, is mounted. The armature is urged into rest position by a spring 13, and when current flows through coil 14, is attracted toward magnet pole 15.

Figure 4:
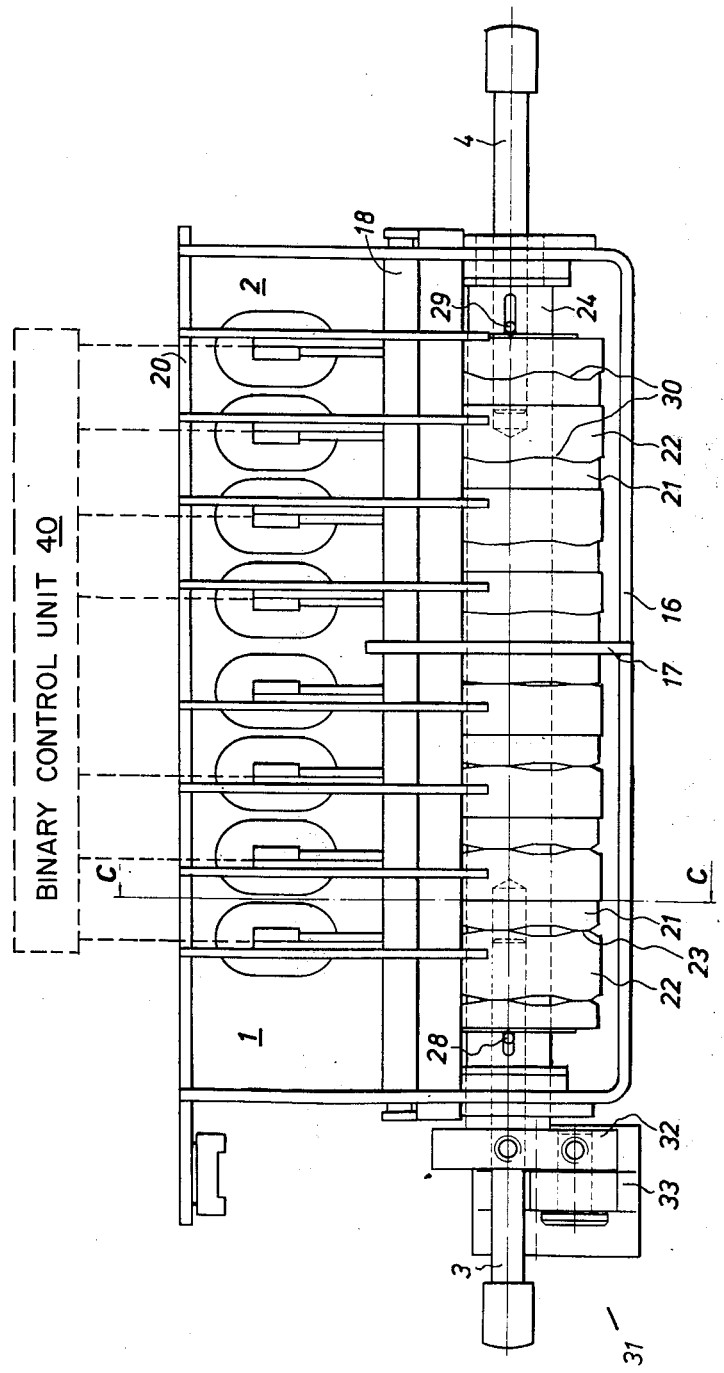
FIG. 4 shows a vertical projection of the converter.

The two sections 1 and 2 are accommodated between the ends of a mounting frame 16, equipped with an intermediate wall 17. The units shown in FIG. 3 are held in place by means of a pair of rods 18, 19, and clamped between them and a top piece 20 of the frame. Each coil 14 has current connections and is coupled to a central control unit, from which pulses issue, constituting operating currents for the coil. The binary codes which are to be converted are supplied to the appropriate electrical magnets by a typical binary control unit 40 as shown in FIG. 4.

Each set of cam discs 5 consists of two cam discs 21, 22 and the contact surface between them is undulating so that the discs are separated when one makes a movement of rotation against the other. Each wave peak on the contact surface represents a cam 23 and the height of these cams varies from cam set to cam set. The axial movements described by the cam sets, when the discs in each set rotate relative to one another, are therefore individual for each set; the length of the relative movement in the various cam sets is determined by the expression $2^n$, in which $n = 0, 1, 2, 3 \ldots$, that is to say the lengths of the relative movements in the different cam sets (in each of the sections 1, 2) are related as 1 to 2 to 4 to 8. The sets are assembled on a tubular shaft 24, hence the individual movements are added, and from this a scale of movement in different lengths between 0 and 15 can be produced in each section 1, 2.

In order that the two discs in a set will be separated, a rotating staged movement of one of the discs is required. Every other disc, 21, in the sections is therefore equipped with projections 25, which are engaged in longitudinal grooves (splines) 26 in tubular shaft 24. The other discs 22 are equipped on the outside with a number of teeth which cooperate with pawls 11, 12. When disc 21 (FIG. 3) is rotated clockwise a stage amounting approximately to a half tooth division on disc 22, the cams will slide in on the one disc or the other, toward one another and stop peak against peak; the discs are separated by a distance equal to the cam height in the present cam set. During the next stage, provided that disc 22 continues to be blocked, the cams will slide apart and the cam set will go back together again.

In both sections 1, 2, the cam sets are axially displaceable on tubular shaft 24 and are pressed together against the intermediate wall 17 by spring forces acting on the outermost discs through transverse pins 28, 29, mounted on pivots 3 and 4, respectively. In FIG. 4 we see the cam sets in section 1 in separated position, and the sets in section 2 in assembled position; the different cam heights in the sets are marked by undulating lines of intersection between the discs in the respective sets.

The force for separating the cam sets, in which the disc equipped with teeth 27 is blocked, is provided by tubular shaft 24 which in turn is driven by a crank mechanism 31. The latter consists of a crank 32 on one end of the tubular shaft, and a connecting rod 33, one end of which is shaped like a ring, which surrounds an eccentric 34 on a driveshaft 35. When the drive shaft rotates, an oscillating motion is transmitted to the tubular shaft, and the discs 21 thereon. The magnitude of this oscillating movement is less than the tooth division on disc 22; thus when this disc in FIG. 3 is rotated over an entire oscillating movement counter-clockwise from the position shown, the next following tooth 27' will not move forward and past pawl 11, but will accompany discs 21, 22 as a result of friction. In the event that armature 8 is thrown into the broken-line position and the oscillating motion is executed from the position shown, tooth 27'' will be caught on pawl 12 and the discs 21, 22, in the course of the rest of the movement, will slide against one another. A further adjustment of the armature means that catch 11 will hook the next tooth and disc 22 is reset into a fresh position.

The adjustment means described above can be made to execute adjustments in very fast succession. It is not unusual for a working machine to make over 1000 machine revolutions per minute, which makes for an adjustment of the cam sets every 50th of a millisecond approximately. The interval for the adjustment itself, however, is substantially shorter than 50 ms, because the adjustment has to be executed during a part of one machine revolution. In the matter of time, the adjustments are fixed at predetermined intervals of, for example, position scanners which record the angular position of the drive shaft during each machine revolution, and release setting pulses to the electromagnets 14 from the electronic unit.

Figures 1, 2:
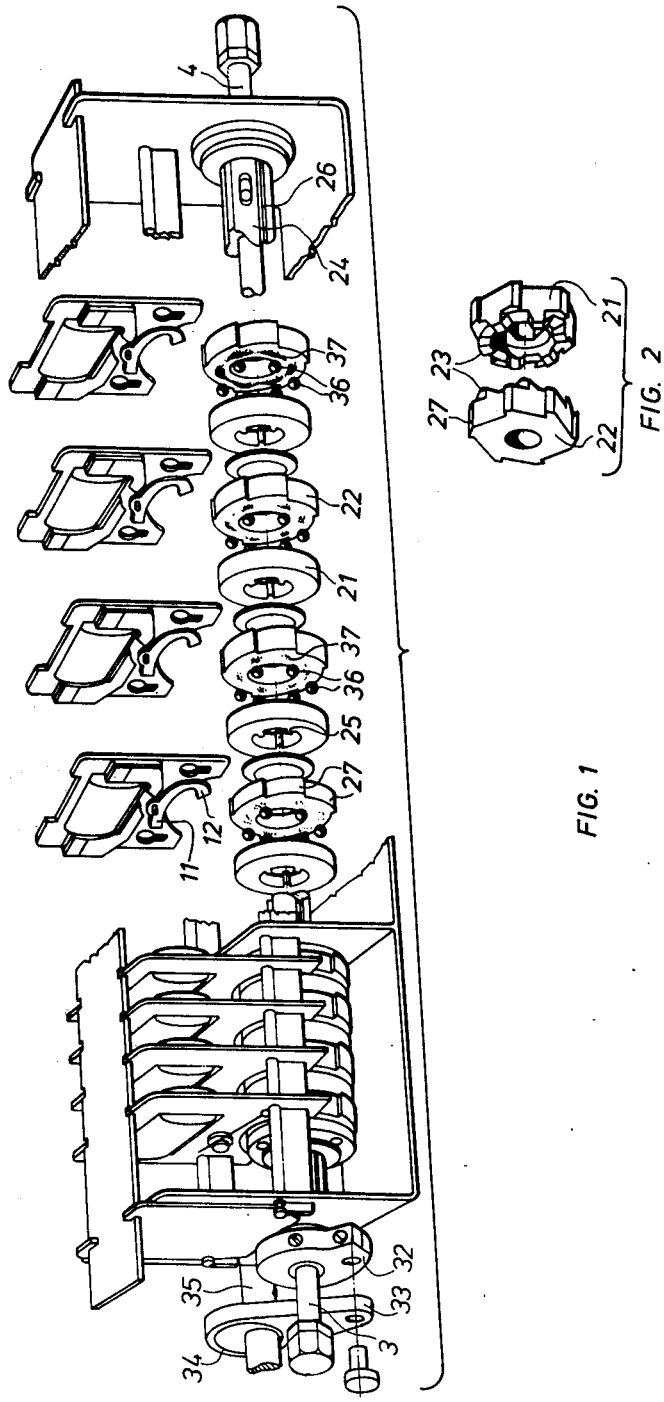
FIG. 1 shows a perspective view of the converter, partly exploded.
FIG. 2 shows an alternate embodiment of a cam set forming part of the converter.

In FIG. 1 we see a variant of the cam sets, containing balls 36 in the one disc and an undulating ballrace 37 in the other, in which the balls run, when the cam set is brought together and the discs are rotated with respect to one another. By means of such an embodiment of the cam set, wear in the latter can be reduced, and production simplified.

Figure 5:
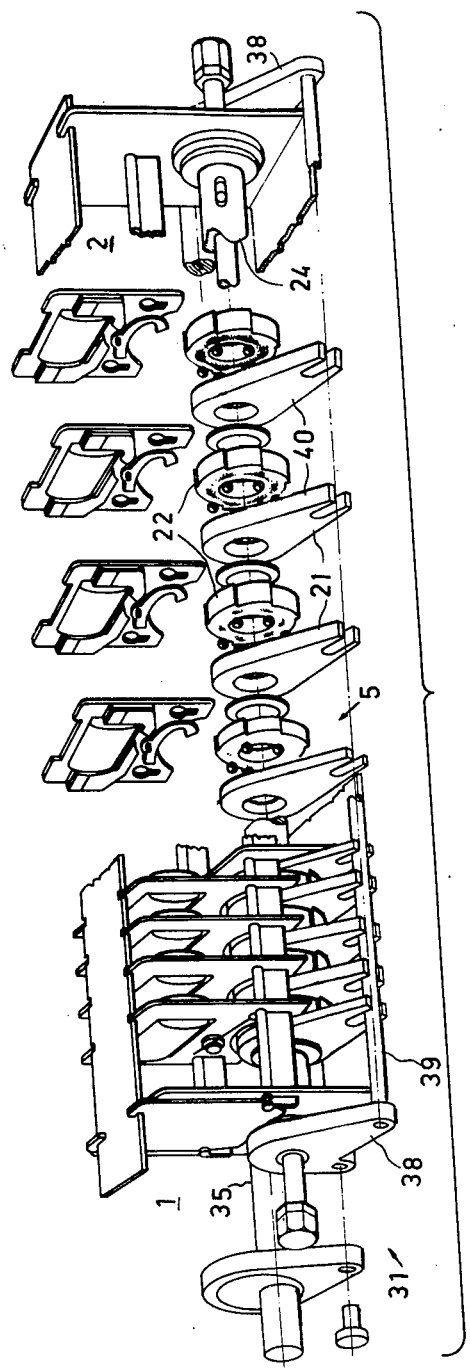
FIG. 5 shows in perspective a variation of the converter shown in FIG. 1.

In FIG. 5 there is shown a variation of the code converter which has a construction similar to that shown in FIG. 1. Thus the code converter comprises two sections 1, 2 which in turn comprise cam plate sets 5 in which are included two cam plates 21, 22. The cam plates are freely mounted on the tubular shaft 24 which in this embodiment is arranged to be stationary throughout. Arranged on an outwardly projecting portion of the shaft 24 at each end of the converter is an angled lever 38. Each lever 38 is driven by a mechanism 31 such as that described in the foregoing. Together, the levers 38 support an operating rod 39 to which the cam plates 21 are connected via arms 40. When the shaft 35 rotates, a pivoting movement is transmitted to the lever 38 and thence, via the rod 39, to the cam plates 21. The thus produced pivoting movement of the cam plates is identical with that described with reference to the embodiment shown in FIG. 1. The external cam plate drive, used with this embodiment, affords the advantage whereby the plates are not in driving engagement with the shaft 24, and are therefore more readily moveable along the same than is the case with the embodiment shown in FIG. 1. A similar external drive can, of course, also be provided for the cam plate sets having cams according to FIG. 2.

The model of a converter described above will serve as an example of how the invention can be embodied. The model can be modifed within the scope of the invention; for example, the drive of the converter can by means of a step-by-step mechanism instead of the crank mechanism shown. Such a stepped movement is produced in simple fashion by a so-called maltese-cross gear. It may also be observed that each one of the two positions marked for armature 8 corresponds either to expanded or assembled positions of the cam discs. Which of the two locked positions of the armature is to correspond to the expanded position of the cam set is, of course, a matter of free choice. Such variants of the invention will be considered to fall within its basic concept which is defined in the following claims.

What is claimed is:

1. A converter for converting binary codes into mechanically controlled movements, comprising adjustment means for receiving code signals from an outside signal source, a plurality of sets of cam discs, a common shaft upon which said sets are mounted and axially displaceable thereon, each of said sets comprising pairs of cam discs having axial cams facing one another, wherein said adjusting means further comprises control elements equipped with locking devices cooperating with locking teeth on the periphery of one cam disc in each said pairs of cam discs, said control elements operable between a locking position and a free position in response to said signals from the signal source, said converter further comprising a converter drive system comprised of an axial arrangement of the cam disc sets on said common shaft in cooperation with an indexing mechanism, driven by a rotating means, for rotatably driving the other cam disc in said pairs of cam discs in an oscillating movement said converter for producing an axial stroke in the respective cam disc sets in which said locking devices assume the locking position, which axial strokes are added in the row of cam disc sets into an output movement relative to a zero position.

2. A converter according to claim 1, characterized in that the indexing mechanism comprises a crank mechanism driven by an eccentric drive means forming part of the drive system of the converter, and a lever system including an operating rod to which the diven cam discs are connected via arms.

3. A converter according to claim 1, characterized in that the sets of cam discs have individual, axial stroke lengths which are added in the row of cam sets into an output movement relative to the zero position, and which have the ratio of 1 to 2 to 4 ... $2n$.

4. A converter according to claim 3, characterized in that the disc placed last in the row calculated from a first disc in the row, transfers the total displacement movement to a maneuvering means.

5. A converter according to claim 1, characterized in that the adjusting means is constituted of control elements equipped with locking devices which cooperate with the stopping means of the cam discs and assume a locking position or a free position relative thereto as a function of signals from the signal source.

6. A converter according to claim 5, characterized in that the control means is constituted of relays, whose armature contains two locking devices cooperating with locking teeth on the outer jacket surfaces of the cam discs.

* * * * *